US012768201B2

(12) United States Patent
Tsai

(10) Patent No.: US 12,768,201 B2
(45) Date of Patent: Oct. 20, 2026

(54) COMBINATION LOCK

(71) Applicant: HANDYWAY CO., LTD., Changhua (TW)

(72) Inventor: Cheng-Yu Tsai, Changhua (TW)

(73) Assignee: HANDYWAY CO., LTD., Changhua (TW)

(*) Notice: Subject to any disclaimer, the term of this patent is extended or adjusted under 35 U.S.C. 154(b) by 0 days.

(21) Appl. No.: 19/027,822

(22) Filed: Jan. 17, 2025

(65) Prior Publication Data

US 2026/0210159 A1 Jul. 23, 2026

(51) Int. Cl.

| | |
|---|---|
| ***E05B 37/02*** | (2006.01) |
| ***E05B 37/00*** | (2006.01) |
| ***E05B 67/28*** | (2006.01) |
| ***E05B 67/32*** | (2006.01) |
| ***E05B 67/36*** | (2006.01) |

(52) U.S. Cl.

CPC .......... *E05B 37/02* (2013.01); *E05B 37/0068* (2013.01); *E05B 67/28* (2013.01); *E05B 67/32* (2013.01); *E05B 67/36* (2013.01)

(58) Field of Classification Search

CPC ...... E05B 37/00; E05B 37/0068; E05B 37/02; E05B 37/025; E05B 67/28; E05B 67/36; E05B 67/06; E05B 67/32

See application file for complete search history.

(56) References Cited

U.S. PATENT DOCUMENTS

| | | | | |
|---|---|---|---|---|
| 1,300,793 A * | 4/1919 | Waterfield | ............ | E05B 37/025 70/53 |
| 8,826,703 B2 * | 9/2014 | Lai | ........................ | E05B 37/025 70/25 |
| 2025/0314096 A1 * | 10/2025 | Lai | ........................ | E05B 37/025 |
| 2026/0009265 A1 * | 1/2026 | Kao | .................... | E05B 73/0082 |

FOREIGN PATENT DOCUMENTS

| | | | | |
|---|---|---|---|---|
| CN | 114704160 A * | 7/2022 | ............. | E05B 15/00 |
| DE | 29812368 U1 * | 2/1999 | ............. | E05B 67/36 |

* cited by examiner

*Primary Examiner* — Alyson M Merlino

(74) *Attorney, Agent, or Firm* — MUNCY, GEISSLER, OLDS & LOWE, P.C.

(57) ABSTRACT

A combination lock comprises a primary lock body and a secondary lock body. The primary lock body includes a base, a sleeve extending toward the secondary lock body with multiple dials mounted on its outer surface, a receiving portion at the distal end of the sleeve, and a movable lock core disposed within the sleeve and the receiving portion. At least one locking pin extends through the receiving portion and abuts against the lock core. The secondary lock body includes a base with a mating hole configured to mate with the receiving portion and at least one drive mechanism disposed within the base. When the primary and secondary lock bodies are disengaged, the drive mechanism drives the at least one locking pin, pushing it into the receiving portion and driving the lock core to move away from the secondary lock body.

7 Claims, 5 Drawing Sheets

COMBINATION LOCK

FIELD OF INVENTION

The present invention relates to combination locks, and more particularly to a combination lock which combines enhanced security with rapid unlocking functionality.

BACKGROUND OF THE PRESENT INVENTION

Conventional combination locks generally include a lock body and a locking rod, which engage to secure the lock. The lock body typically incorporates a combination dial mechanism for setting and adjusting the password combination. When the dials are rotated to the correct combination, the locking rod or pin disengages from the lock body, allowing the lock to be opened. However, traditional combination locks have several practical limitations due to their simplified locking mechanisms. In terms of structural stability, such locks are prone to loosening when subjected to external impacts or prolonged tensile forces, thereby compromising their locking effectiveness. Moreover, their anti-theft performance is suboptimal because the simplified structure makes them vulnerable to tampering or damage by unauthorized individuals.

SUMMARY OF THE PRESENT INVENTION

In view of the aforementioned deficiencies, the present invention provides a combination lock incorporating a locking mechanism that integrates enhanced anti-theft and highly stable structural features while facilitating a rapid unlocking functionality.

In order to achieve the purposes of the present invention, a combination lock is provided, comprising a primary lock body and a secondary lock body engaged with the primary lock body. The combination lock is characterized by the following: a base configured in the primary lock body; a sleeve extending from the base toward the secondary lock body, with multiple dials mounted on the outer circumferential surface of the sleeve near the base; a receiving portion positioned at the distal end of the sleeve, opposite the base, with at least one locking pin extending through the outer circumferential wall of the receiving portion; and a lock core extending through the base and movably disposed within the sleeve and the receiving portion, wherein the at least one locking pin is configured to abut against one end of the lock core. The secondary lock body includes a base with a mating hole configured to mate with the receiving portion, and at least one drive mechanism disposed within the base. When the primary lock body engages with the secondary lock body, the at least one drive mechanism presses against the at least one locking pin.

Wherein, the end of the lock core received within the receiving portion includes an outer circumferential surface, a guiding surface, and a projection. The projection is positioned at the tip of the lock core, while the guiding surface is sloped toward the projection and located between the outer circumferential surface and the projection.

Wherein, each locking pin is configured as a cylindrical with a ring element or spherical body.

Wherein, the opposite end of the lock core is operatively connected to a return mechanism.

Wherein, at least one limit block is disposed within the receiving portion.

Wherein, the return mechanism includes a button and a spring. The spring is mounted on the lock core and is operatively connected to the button and the base of the primary lock body.

Wherein, each drive mechanism comprises a force plate and a spring. Each spring is configured to connect the respective force plate and the base of the secondary lock body.

Wherein, the primary lock body and the secondary lock body further include two primary engagement arms and two secondary engagement arms, respectively. The two primary engagement arms extend arcuately from both sides of the base of the primary lock body toward the secondary lock body, while the two secondary engagement arms extend arcuately from both sides of the base of the secondary lock body toward the primary lock body. Each primary engagement arm engages with a corresponding secondary engagement arm to form a locking clasp.

DETAILED DESCRIPTION OF THE PREFERRED EMBODIMENTS

In order to provide a comprehensive understanding of the present invention, a detailed description is set forth below with reference to the accompanying drawings, illustrating preferred embodiments. However, these embodiments are merely exemplary and do not limit the scope of the present invention. It should be noted that directional terms such as "front," "back," "up," "down," "left," and "right" are used for ease of description and understanding. These terms are not restrictive, as the same or equivalent functions can be achieved through alternative orientations or configurations.

In the present invention, the following directional definitions are provided for clarity: the direction in which a receiving portion 14 is engaged with a mating hole 211, corresponding to the X-axis, is referred to as a left-right direction, the rotation direction of dials 15, corresponding to the Y-axis, is referred to as a front-back direction, and the direction in which the locking pin 141 is inserted into the receiving portion 14, corresponding to the Z-axis, is referred to as an up-down direction.

Figure 1:
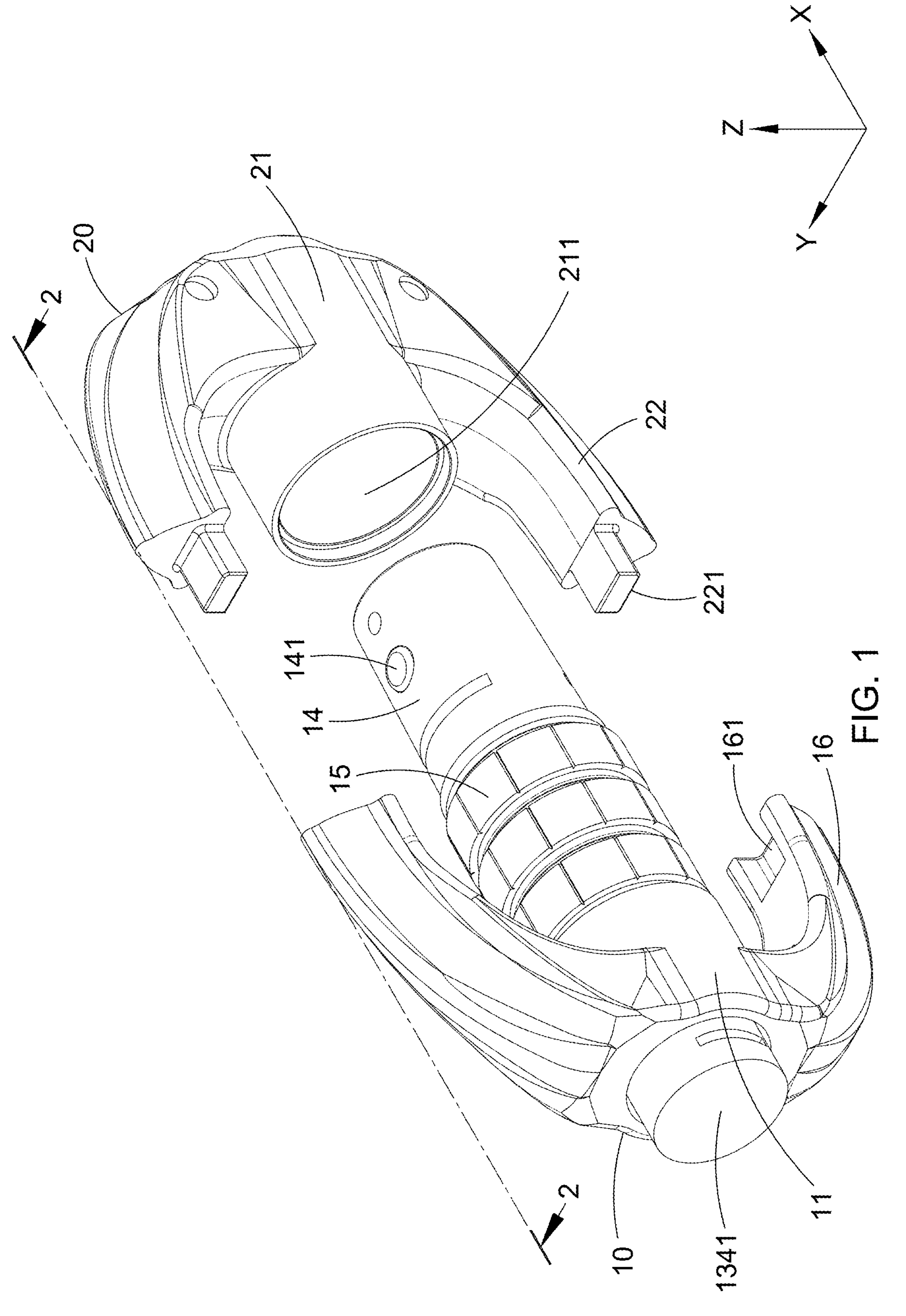
FIG. 1 is a schematic view illustrating the unlocked state of the combination lock according to the present invention.
Figure 2:
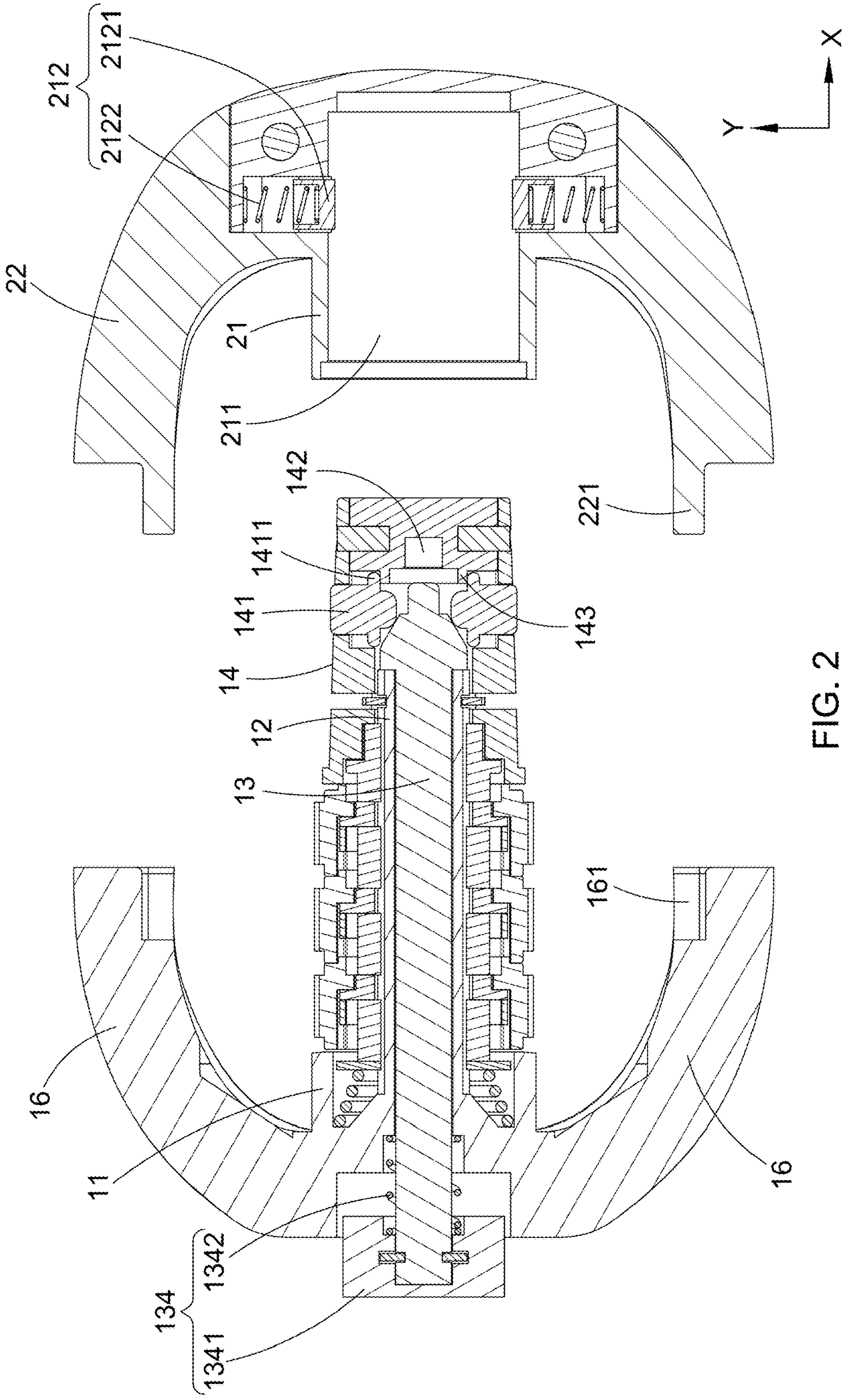
FIG. 2 is a sectional view illustrating the unlocked state of the combination lock according to the present invention.
Figure 3:
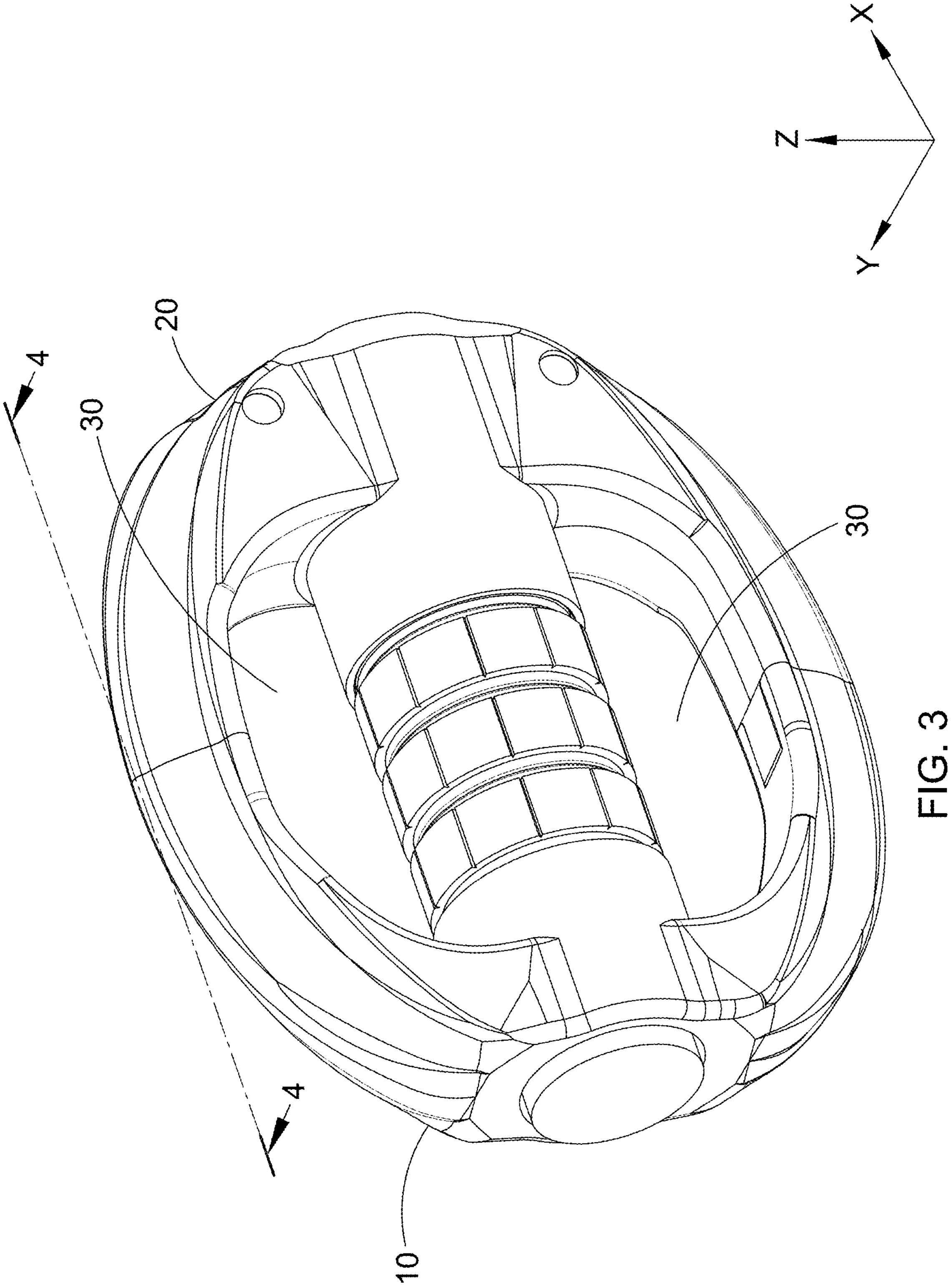
FIG. 3 is a schematic view illustrating the locked state of the combination lock according to the present invention.
Figure 4:
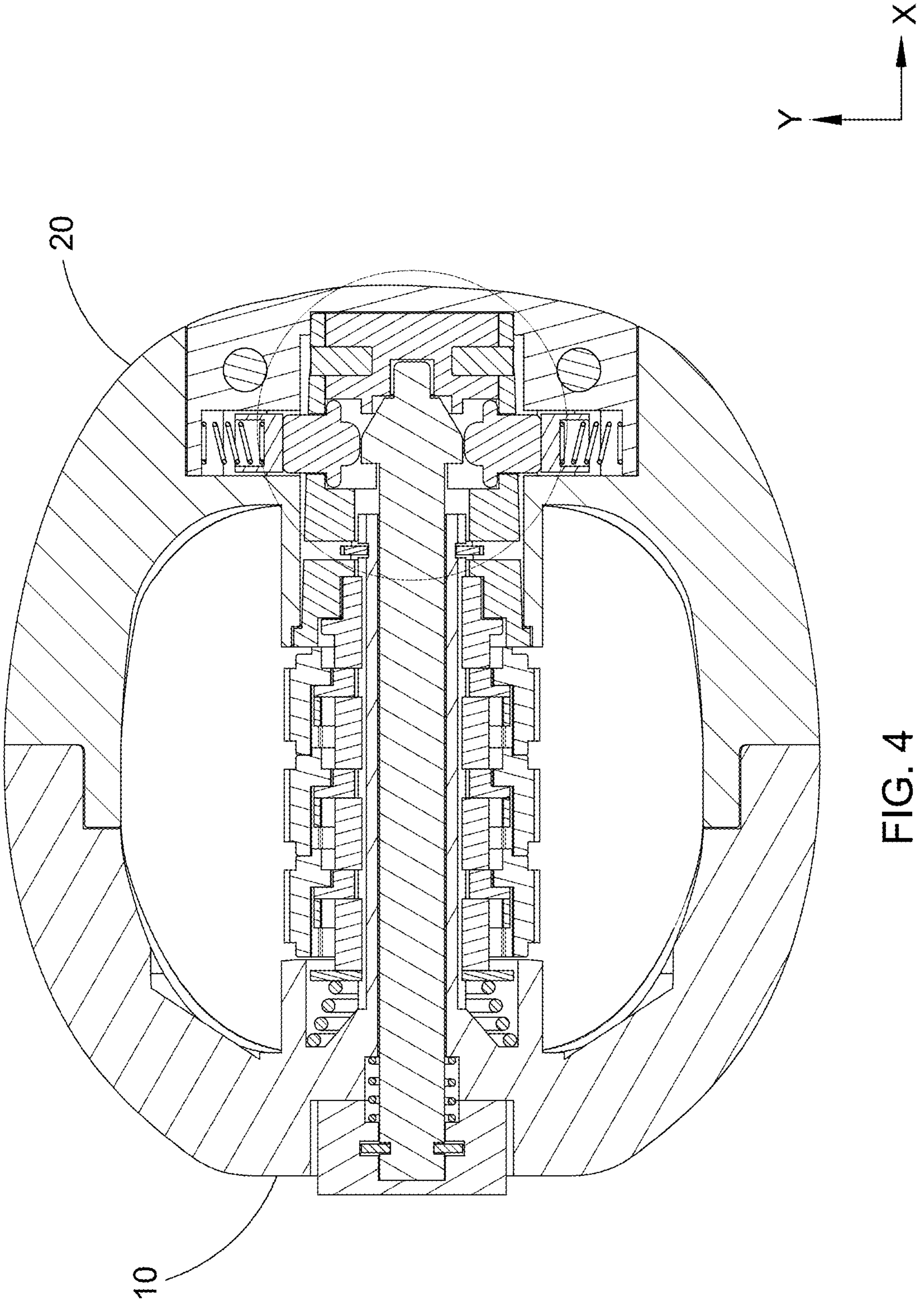
FIG. 4 is a sectional view illustrating the locked state of the combination lock according to the present invention.

Referring to FIGS. 1 and 2, which show schematic views of the combination lock in its unlocked state according to the present invention. The combination lock comprises a primary lock body 10 and a secondary lock body 20. When the primary lock body 10 engages with the secondary lock body 20, the assembly forms an oval-shaped combination lock with dual locking clasps 30, as shown in FIGS. 3 and 4.

The primary lock body 10 includes a base 11, a sleeve 12, and a receiving portion 14. The sleeve extends from the base 11 along the X-axis toward the secondary lock body 20, with its distal end connected to the receiving portion 14. A lock core 13 extends through the base 11 and is movably disposed within the sleeve 12 and the receiving portion 14. The lock core 13 is capable of linear movement along the X-axis, and a return mechanism 134 is positioned at the end of the lock core 13 that also extends through the base 11. The return mechanism 134 applies a force which can bias the lock core 13 to the right. Multiple dials 15 are mounted on the outer circumferential surface of the sleeve 12 near the base 11. These dials 15 function as mechanisms for securing the lock core 13, configuring password settings, and performing unlocking operations. At least one locking pin 141 extends through the outer circumferential surface of the receiving portion 14 along the Y-axis. The locking pin 141 is capable of linear movement in a direction perpendicular to the movement direction of the lock core 13. In the preferred embodiment, two locking pins 141 are provided. These pins 141 move inwardly along the Y-axis into the receiving portion 14 and press against the free end of the lock core 13, thereby driving it to the left.

The return mechanism 134 further comprises a spring 1342 and a button 1341. The spring 1342 coils around the lock core 13 and is connected to both the button 1341 and the interior of the base 11. The button 1341 may be connected to the end of the lock core 13 via a C-ring or similar structure. When the button 1341 is pressed to the right, it compresses the spring 1342 and moves the lock core 13 in the same direction. When the button 1341 is released, the spring 1342 rebounds, exerting a force that moves the lock core 13 and the button 1341 to the left.

The secondary lock body 20 includes another base 21, which has a mating hole 211 configured to mate with the receiving portion 14. At least one drive mechanism 212 is disposed within the base 21 and is capable of moving along the Y-axis. In this embodiment, the number of the drive mechanisms 212 is equal to the number of the locking pins 141. When the primary lock body 10 engages with the secondary lock body 20, the drive mechanisms 212 press against the locking pins 141, causing them to move toward each other. The movement directions of the drive mechanisms 212 and the locking pins 141 must align to ensure accurate engagement of the locking pins 141 with the free end of the lock core 13. This alignment facilitates proper engagement of the primary lock body 10 and the secondary lock body 20, thereby preventing damage caused by misalignment.

Each drive mechanism 212 comprises a force plate 2121 and a spring 2122. The spring 2122 connects the force plate 2121 to the interior of the base 21 along the Y-axis. When the locking pins 141 push against the force plates 2121, the force plates 2121 compress the springs 2122 as they move inward into the base 21. Once the force exerted by the locking pins 141 is removed, the springs 2122 rebound, exerting a force that moves the force plates 2121 outward and pushes the locking pins 141.

The primary lock body 10 and the secondary lock body 20 also include two primary engagement arms 16 and two secondary engagement arms 22, respectively. The two primary engagement arms 16 extend from both sides of the base 11 of the primary lock body 10 in opposite directions along the Z-axis for a distance and then curve toward the secondary lock body 20, while the two secondary engagement arms 22 extend from both sides of the base 21 of the secondary lock body 20 and are arranged symmetrically to the two primary engagement arms 16. These engagement arms not only enhance the user's grip and ease of operation, but also, when the receiving portion 14 and the mating hole 211 are locked together, each primary engagement arm 16 interlocks with a corresponding secondary engagement arm 22 to form one locking clasp 30, enabling two different objects to be locked together. In other embodiments, each primary engagement arm 16 may include a latch slot 161 which engages with a latch element 221 on each secondary engagement arm 22, thereby improving overall stability.

Figure 5:
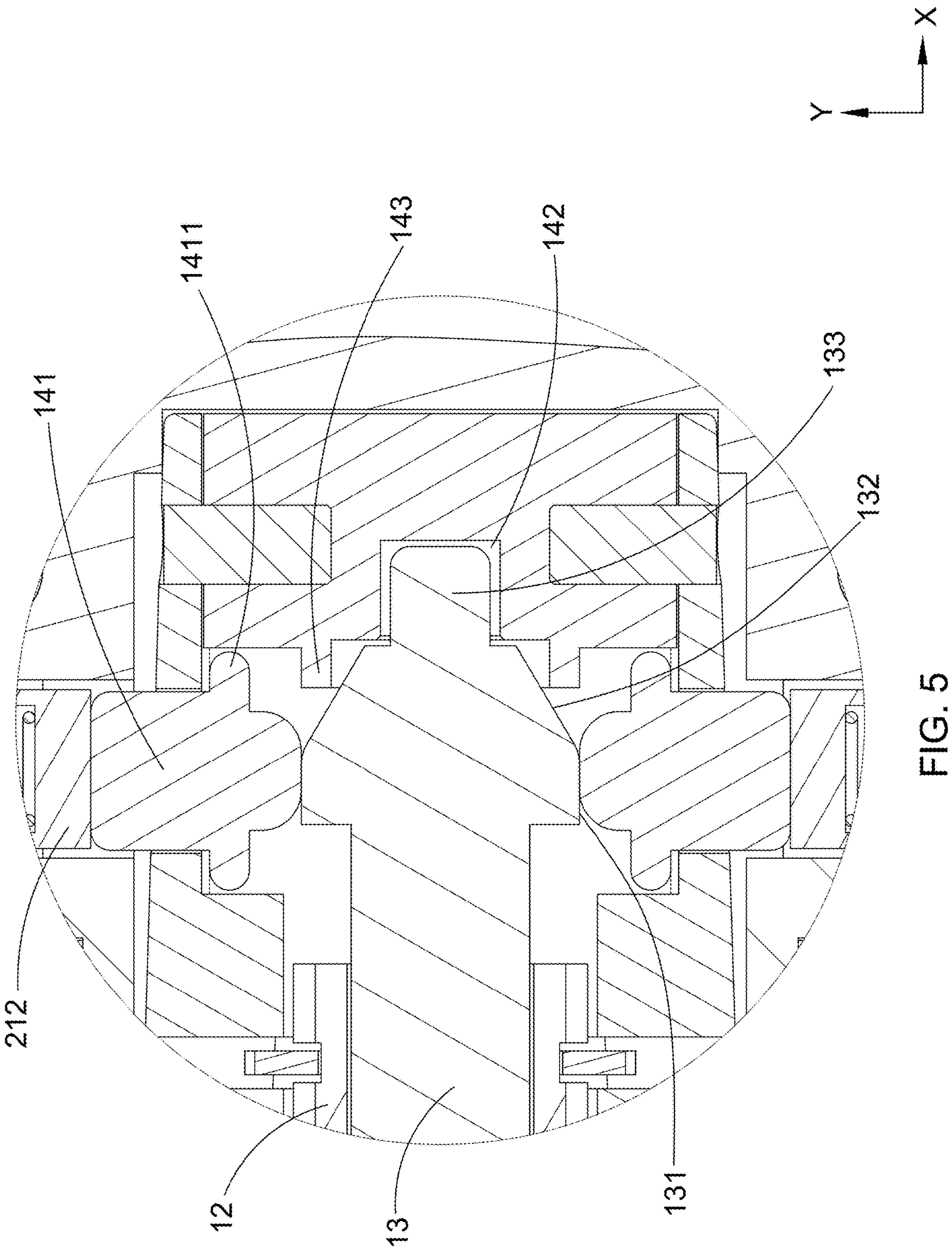
FIG. 5 is an enlarged partial view of FIG. 4.

Referring to FIG. 5, which is a partial enlargement of FIG. 4. The lock core 13 is cylindrical, with its free end having an outer circumferential surface 131, a guiding surface 132, and a projection 133. The projection 133 is located at the tip of the lock core 13, while the guiding surface 132 is located between the outer circumferential surface 131 and the projection 133. The diameter of the projection 133 is smaller than that of the outer circumferential surface 131, resulting in the guiding surface 132 sloping toward the projection 133. When the lock core 13 moves to the right, the projection 133 fits into a cavity 142 within the receiving portion 14, and the two locking pins 141 abut against the outer circumferential surface 131. Conversely, when the lock core 13 moves to the left, the projection 133 exits the cavity 142, and the two locking pins 141 abut against the guiding surface 132.

Furthermore, at least one limit block 143 is positioned near the opening of the cavity 142. In this embodiment, the limit block 143 is cylindrical and ring-shaped, extending along the X-axis from the opening of the cavity 142 toward the primary lock body 10. Each locking pin 141 is a cylindrical body with a ring element 1411 oriented perpendicular to its longitudinal axis. The limit block 143 functions to halt the motion of the two ring elements 1411 as the locking pins 141 move toward each other. In alternative embodiments, each locking pin 141 is spherical, with the diameter of the spheres matching that of the ring elements 1411 to allow direct interaction with the limit block 143.

To further illustrate the operation of the present invention, during the locking process, the user combines the primary lock body 10 with the secondary lock body 20 and presses the return mechanism 134 to move the lock core 13 to the right. This movement causes the lock core 13 to abuts against the two locking pins 141, causing them to lean against the guiding surface 132 and move outwardly from the receiving portion 14. At the same time, the two locking pins 141 push the two drive mechanisms 212 apart. Once the locking pins 141 have disengaged from the guiding surface 132 and come into engagement with the outer circumferential surface 131, the user scrambles the dials 15 to immobilize the lock core 13, thus completing the locking operation. During unlocking, the user rotates the dials 15 to the correct combination, allowing the return mechanism 134 to exert a force that moves the lock core 13 to the left. At the same time, the two drive mechanisms 212 push against the two locking pins 141, causing them to slide inwardly along the slope of the guiding surface 132. This action generates an additional force which drives the lock core 13 further to the left. Finally, the user pulls the primary lock body 10 and the secondary lock body 20 in opposite directions to separate them, thus completing the unlocking operation.

From the above description, it can be seen that the combination lock places the lock core 13 within the sleeve 12 and the receiving portion 14, which can effectively protect the lock core 13 from external forces or potential damage. In addition, the complex locking mechanism minimizes the risk of tampering with tools, thereby significantly improving theft prevention. Furthermore, the coordinated operation of the two locking pins 141 and the two drive mechanisms 212 enables rapid unlocking, providing users with a more convenient and efficient locking experience.

What is claimed is:

1. A combination lock comprising a primary lock body and a secondary lock body configured to engage with the primary lock body, wherein, the primary lock body includes a base, a sleeve extending from the base toward the secondary lock body when the primary lock body is engaged with the secondary lock body, with multiple dials mounted on an outer circumferential surface of the sleeve near the base, a receiving portion positioned at a distal end of the sleeve, opposite the base, with at least one locking pin extending through an outer circumferential wall of the receiving portion, and a lock core extending through the base and movably disposed within the sleeve and the receiving portion, wherein the at least one locking pin is configured to abut against one end of the lock core; and the secondary lock body includes a base with a mating hole configured to mate with the receiving portion, and at least one drive mechanism disposed within the base, wherein, when the primary lock body engages with the secondary lock body, the at least one drive mechanism presses against the at least one locking pin;

wherein the at least one drive mechanism comprises a force plate and a spring, wherein the spring is configured to connect the force plate and the base of the secondary lock body.

2. The combination lock according to claim 1, wherein the one end of the lock core is received within the receiving portion when the primary lock body engages with the secondary lock body, wherein the one end of the lock core includes an outer circumferential surface, a guiding surface, and a projection, wherein the projection is positioned at a tip of the one end of the lock core, while the guiding surface is sloped toward the projection and located between the outer circumferential surface and the projection.

3. The combination lock according to claim 2, wherein the at least one locking pin is configured as a cylindrical with a ring element.

4. The combination lock according to claim 2, wherein an opposite end of the lock core is connected to a return mechanism.

5. The combination lock according to claim 3, wherein a limit block is disposed within the receiving portion.

6. The combination lock according to claim 4, wherein the return mechanism includes a button and a spring, wherein the spring is mounted on the lock core and is connected to the button and the base of the primary lock body.

7. The combination lock according to claim 6, wherein the primary lock body and the secondary lock body each include two primary engagement arms and two secondary engagement arms, respectively, wherein the two primary engagement arms extend arcuately from both sides of the base of the primary lock body toward the secondary lock body, while the two secondary engagement arms extend arcuately from both sides of the base of the secondary lock body toward the primary lock body, with a corresponding one of the secondary engagement arms to form a locking clasp when the primary lock body is engaged with the secondary lock body.

* * * * *